(12) United States Patent
Wen et al.

(10) Patent No.: US 12,346,197 B2
(45) Date of Patent: Jul. 1, 2025

(54) OPTICAL COHERENCE COMPUTATION APPARATUS AND AN ERROR CORRECTION METHOD THEREOF

(71) Applicant: Beijing QBoson Quantum Technology Co., Ltd., Beijing (CN)

(72) Inventors: Kai Wen, Beijing (CN); Yin Ma, Beijing (CN)

(73) Assignee: Beijing QBoson Quantum Technology Co., Ltd., Beijing (CN)

( * ) Notice: Subject to any disclaimer, the term of this patent is extended or adjusted under 35 U.S.C. 154(b) by 0 days.

(21) Appl. No.: 19/054,908

(22) Filed: Feb. 16, 2025

(65) Prior Publication Data

US 2025/0190299 A1 Jun. 12, 2025

Related U.S. Application Data

(63) Continuation of application No. PCT/CN2023/112863, filed on Aug. 14, 2023.

(30) Foreign Application Priority Data

Aug. 16, 2022 (CN) .......................... 202210978516.8

(51) Int. Cl.
G02F 1/39 (2006.01)
G02F 3/00 (2006.01)
G06E 3/00 (2006.01)
G06F 11/07 (2006.01)

(52) U.S. Cl.
CPC ............ *G06F 11/0793* (2013.01); *G06E 3/00* (2013.01)

(58) Field of Classification Search
CPC ............................... G06F 11/0793; G06E 3/11
USPC .......................................................... 359/239
See application file for complete search history.

(56) References Cited

U.S. PATENT DOCUMENTS

2018/0246393 A1   8/2018   Inagaki et al.

FOREIGN PATENT DOCUMENTS

| CN | 113178775 A | 7/2021 |
| CN | 114579348 A | 6/2022 |
| JP | 2000338246 A | 12/2000 |
| JP | 2015114354 A | 6/2015 |
| WO | 2016099565 A1 | 6/2016 |

OTHER PUBLICATIONS

First Office Action issued in counterpart Chinese Patent Application No. 202210978516.8, dated Jan. 20, 2023.

(Continued)

*Primary Examiner* — Bumsuk Won
*Assistant Examiner* — Grant A Gagnon
(74) *Attorney, Agent, or Firm* — Westbridge IP LLC

(57) ABSTRACT

Disclosed are an optical coherence computation apparatus and an error correction method. The optical coherence computation apparatus includes: a laser, a first beam splitter, a second beam splitter, a third beam splitter, a first modulator, a second modulator, a third modulator, a first converter, a second converter, a first coupler, a second coupler, an injector, a homodyne detector and a computation control module. By using the above-mentioned optical coherence computation apparatus and the error correction method, the computation speed and computation accuracy of the optical coherence computation apparatus during the process of solving computation problems to be processed can be effectively improved.

11 Claims, 2 Drawing Sheets

(56) References Cited

OTHER PUBLICATIONS

Cheng et al., Advances and Challenges of Optoelectronic Intelligent Computing, Chinese Journal of Lasers, vol. 49, No. 12, pp. 1-13, dated Jul. 16, 2022.

Takesue et al., Simulating One- and Two-Dimensional Ising Models in a Magnetic Field Using a Coherent Ising Machine, 2020 Conference on Lasers and Electro-Optics (CLEO), dated Sep. 10, 2020.

OPTICAL COHERENCE COMPUTATION APPARATUS AND AN ERROR CORRECTION METHOD THEREOF

CROSS-REFERENCE TO RELATED APPLICATIONS

This application is a continuation of International Application No. PCT/CN2023/112863, filed on Aug. 14, 2023, which claims priority to Chinese Patent Application No. 202210978516.8, filed on Aug. 16, 2022. The disclosures of the above-mentioned applications are hereby incorporated by reference in their entireties.

TECHNICAL FIELD

The present application relates to the technical field of data computation technology, in particular to an optical coherence computation apparatus and an error correction method thereof.

BACKGROUND

In the field of data computation technology, it is often necessary to use optical coherence computation apparatus to calculate some complex computation problems. Among them, the coherent Ising machine is a commonly used optical coherence computation apparatus.

The coherent Ising machine is a physical solver based on degenerate optical parametric oscillation. It can map the combinatorial optimization problem to the Ising model, and then search for the optimal solution by searching the ground state energy, which can effectively solve the combinatorial optimization problems.

However, in the prior art, the coherent Ising machine has the problem of amplitude heterogeneity during the computation process, which can lead to mapping errors.

SUMMARY

In view of this, the present application provides an optical coherence computation apparatus and an error correction method thereof, thereby effectively improving the computation speed and computation accuracy of the optical coherence computation apparatus during the process of solving the computation problems to be processed.

The technical solution of the present application is specifically achieved as follows.

An optical coherence computation apparatus, the optical coherence computation apparatus comprises: a laser, a first beam splitter, a second beam splitter, a third beam splitter, a first modulator, a second modulator, a third modulator, a first converter, a second converter, a first coupler, a second coupler, an injector, a homodyne detector and a computation control module; wherein, an output end of the laser is connected to an input end of the first beam splitter;
an output end of the first beam splitter is respectively connected to input ends of the first modulator and the second modulator;
an output end of the first modulator is connected to an input end of the first converter;
an output end of the first converter is connected to an input end of the first coupler;
an output end of the first coupler is connected to an input end of the second converter;
an output end of the second converter is connected to an input end of the third beam splitter;
an output end of the third beam splitter is connected to input ends of the homodyne detector and the second coupler respectively;
an output end of the second modulator is connected to an input end of the second beam splitter;
an output end of the second beam splitter is connected to input ends of the homodyne detector and the third modulator respectively;
an output end of the homodyne detector is connected to an input end of the computation control module;
an output end of the computation control module is connected to input ends of the third modulator and the injector respectively;
an output end of the third modulator is connected to an input end of the second coupler;
an output end of the second coupler is connected to an input end of the injector;
an output end of the injector is connected to an input end of the first coupler; and
the first coupler, the second converter, the third beam splitter, the second coupler and the injector are connected in sequence through optical fibers to form a ring resonator.

Optionally, the laser is used to output a pulse laser with a first wavelength;
the first beam splitter is used to divide the pulse laser output by the laser into two pulse lasers, which are output to the first modulator and the second modulator respectively;
the first modulator is used to periodically output a first timing sequence pulse group to the first converter according to the received pulse laser; wherein each first timing sequence pulse group comprises n pulse lasers, and n is an integer greater than 1;
the first converter is used to convert the received pulse laser with a first wavelength into a pulse laser with a second wavelength, and input the pulse laser to the second converter in the ring resonator through the first coupler;
the second converter is used to convert the received pulse laser with a second wavelength into a pulse laser with a first wavelength, and transmit the pulse laser to the third beam splitter;
the third beam splitter is used to divide each received pulse laser into two pulse lasers; wherein one pulse laser is output to the second coupler; and the other pulse laser is output to the homodyne detector;
the second modulator is used to periodically output a second timing sequence pulse group to the second beam splitter according to the received pulse laser; wherein each second timing sequence pulse group comprises n pulse lasers; there is a preset first time interval between the time when the second modulator outputs the second timing sequence pulse group and the time when the first modulator outputs the first timing sequence pulse group;
the second beam splitter is used to divide each received pulse laser into two pulse lasers; wherein one pulse laser is output to the third modulator and the other pulse laser is output to the homodyne detector;
the homodyne detector is used to perform balanced homodyne detection according to the two received pulse lasers, and send an electrical signal to the computation control module according to the measurement result;

the computation control module is used to calculate the current pulse spin sign and the current Ising energy according to the received electrical signal and the preset constraint matrix, and send the corresponding modulation instruction to the third modulator according to the preset dissipation intensity and coupling intensity, and send the corresponding injection instruction to the injector;

the third modulator is used to modulate the intensity and/or phase of the pulse laser passing through according to the modulation instruction, and output the modulated pulse laser to the second coupler, so as to be input into the ring resonator through the second coupler;

the second coupler is used to output the received pulse laser to the injector; and the injector is used to perform mutual injection operation on the received first timing sequence pulse group and second timing sequence pulse group according to the injection instruction, and output the first timing sequence pulse group and the second timing sequence pulse group after completing the mutual injection operation to the second converter through the first coupler; wherein, there is a preset first time interval between the time when the injector outputs the second timing sequence pulse group and the time when the injector outputs the first timing sequence pulse group.

Optionally, the optical coherence computation apparatus further comprises: a timer; wherein, the timer is used to send a stop instruction to the computation control module when the running time of the optical coherence computation apparatus is equal to or exceeds a preset time threshold; and the computation control module is used to output the current optimal computation result as the final computation result according to the stop instruction.

Optionally, the injector comprises: a delay module, an injection module and a beam combining module;

the delay module is used to delay the received pulse laser according to the preset delay strategy, so that the first pulse in the first timing sequence pulse group and the first pulse in the second timing sequence pulse group are simultaneously transmitted to the two input ends of the injection module;

the injection module is used to perform mutual injection operation on the corresponding pulse lasers in the first timing sequence pulse group and the second timing sequence pulse group according to the injection instruction; and the beam combining module is used to delay the received pulse lasers according to the preset delay strategy, and output the received pulse lasers to the first coupler in sequence according to the preset first time interval and sending order, forming the first timing sequence pulse group and the second timing sequence pulse group after completing injection, and the two timing sequence pulse groups are still separated by the preset first time interval.

Optionally, the third modulator comprises: an intensity modulator and a phase modulator;

the intensity modulator is used to modulate the intensity of the corresponding pulse laser according to the modulation instruction; and the phase modulator is used to modulate the phase of the corresponding pulse laser according to the modulation instruction.

Optionally, the first converter is a second harmonic generator.

Optionally, the first converter and the second converter are both periodically poled lithium niobate crystals.

Optionally, the computation control module is a field programmable gate array.

The present application also proposes an error correction method for an optical coherence computation apparatus, the method comprising:

Step A, setting an optical coherence computation apparatus as described above;

Step B, presetting a constraint matrix in the computation control module of the optical coherence computation apparatus according to the computation problem to be processed;

Step C, starting the optical coherence computation apparatus so that the laser in the optical coherence computation apparatus periodically outputs pulse laser with the first wavelength to the first beam splitter;

Step D, the first beam splitter dividing each received pulse laser into two pulse lasers, which are output to the first modulator and the second modulator respectively;

Step E, the first modulator and the second modulator periodically outputting a first timing sequence pulse group and a second timing sequence pulse group each having n pulse lasers, respectively, according to the received pulse laser, with a preset first time interval between the first timing sequence pulse group and the second timing sequence pulse group; wherein n is an integer greater than 1;

Step F, the first timing sequence pulse group output by the first modulator being converted into wavelength by the first converter, and then being inputted into the ring resonator through the first coupler, and then being converted into wavelength by the second converter, and then being transmitted to the third beam splitter;

Step G, the third beam splitter dividing each received pulse laser into two pulse lasers, one of which is output to the homodyne detector, and the other pulse laser continuing to be output to the second coupler through the ring resonator, and continuing to be output to the injector through the ring resonator;

Step H, the second timing sequence pulse group output by the second modulator being transmitted to the second beam splitter; the second beam splitter dividing each received pulse laser into two pulse lasers, which are transmitted to the third modulator and the homodyne detector respectively;

Step I, the homodyne detector performing balanced homodyne detection according to the two received pulse lasers, and sending an electrical signal to the computation control module according to the measurement result;

Step J, the computation control module calculating the current pulse spin sign and the current Ising energy according to the received electrical signal and the preset constraint matrix, taking the current Ising energy as the optimal energy value, and taking the current pulse spin sign and the current Ising energy as the current optimal computation result; and sending the corresponding modulation instruction to the third modulator and the corresponding injection instruction to the injector according to the preset dissipation intensity and the initial value of the coupling intensity;

Step K, the third modulator modulating the intensity and/or phase of the pulse laser passing through according to the modulation instruction, and outputting the modulated pulse laser to the second coupler, inputting the pulse laser into the ring resonator through the second coupler, and outputting the pulse laser to the injector through the ring resonator;

Step L, the injector performing mutual injection operation on the received first timing sequence pulse group and second timing sequence pulse group according to the injection instruction and outputting the first timing sequence pulse group and the second timing sequence pulse group; after completing the mutual injection operation, the first timing sequence pulse group and the second timing sequence pulse group being transmitted to the third beam splitter in the ring resonator through the first coupler and the second converter in turn;

Step M, the third beam splitter dividing each received timing sequence pulse into two pulse lasers, one of which continuing to be transmitted in the ring resonator, and the other pulse laser being output to the homodyne detector;

Step N, the homodyne detector performing balanced homodyne detection according to the two pulse lasers received from the two input ends, and sending an electrical signal to the computation control module according to the measurement results;

Step O, the computation control module calculating the current pulse spin sign and the current Ising energy according to the received electrical signal and the preset constraint matrix;

Step P, determining whether the current Ising energy $E_i$ is less than the current optimal energy value; if so, executing step Q; otherwise, executing step R;

Step Q, the computation control module taking the current Ising energy as the optimal energy value, and taking the current pulse spin sign and the current Ising energy as the current optimal computation result; updating the values of the dissipation intensity and the coupling intensity according to the preset adjustment value, and sending the corresponding modulation instruction to the third modulator and the corresponding injection instruction to the injector according to the updated the values of dissipation intensity and coupling intensity; returns to execute step K; and Step R, the computation control module resetting the values of dissipation intensity and coupling intensity, and sending the corresponding modulation instruction to the third modulator and the corresponding injection instruction to the injector according to the reset values of dissipation intensity and coupling intensity; returning to execute step K.

Optionally, before returning to execute step K, the method further comprises:
determining whether the running time of the optical coherence computation apparatus is less than a preset time threshold; and
if yes, returning to execute step K; otherwise, the computation control module outputting the current optimal computation result as the final computation result.

Optionally, the updating of the values of the dissipation strength and the coupling strength according to the preset adjustment value comprises:
adding the current values of the dissipation intensity and the coupling intensity by the preset adjustment value respectively as the updated values of the dissipation intensity and the coupling intensity.

Optionally, resetting the values of dissipation intensity and coupling intensity comprises:
randomly selecting a value from a preset first value range as the current value of dissipation intensity; and taking the initial value of coupling intensity as the current value of coupling intensity.

As can be seen from the above, in the optical coherence computation apparatus and an error correction method thereof in the present application, a preset number of auxiliary error correction pulses without nonlinear gain are introduced into a laser pulse network based on a degenerate optical parametric oscillator and having a preset number of mutually coupled pulses, so that they can be coupled with a nonlinear gain pulse to form a pulse neuron, and the error correction of the computation process of the optical coherence computation apparatus is realized through the dynamic characteristics of the pulse neuron. By comparing the current Ising energy with the optimal value of the current energy, and performing subsequent operations according to the comparison result, the search for the optimal solution can be realized by searching the ground state energy; and even when the computation process falls into a fixed point of the local optimal value, the local optimal value can be destabilized by changing the parameter conditions, so that a better global optimal solution can be obtained, thereby effectively solving the problem of amplitude heterogeneity in the coherent Ising machine in the prior art that cannot be correctly mapped, improving the computation performance of the optical coherence computation apparatus, and significantly improving the computation speed and computation accuracy of the optical coherence computation apparatus during the process of solving the computation problems to be processed.

DETAILED DESCRIPTION OF THE EMBODIMENTS

In order to make the technical solution and advantages of the present application more clearly and understandable, the present application is further described in detail below in combination with the accompanying drawings and specific embodiments.

The present application proposes an optical coherence computation apparatus and an error correction method thereof.

Figure 1:
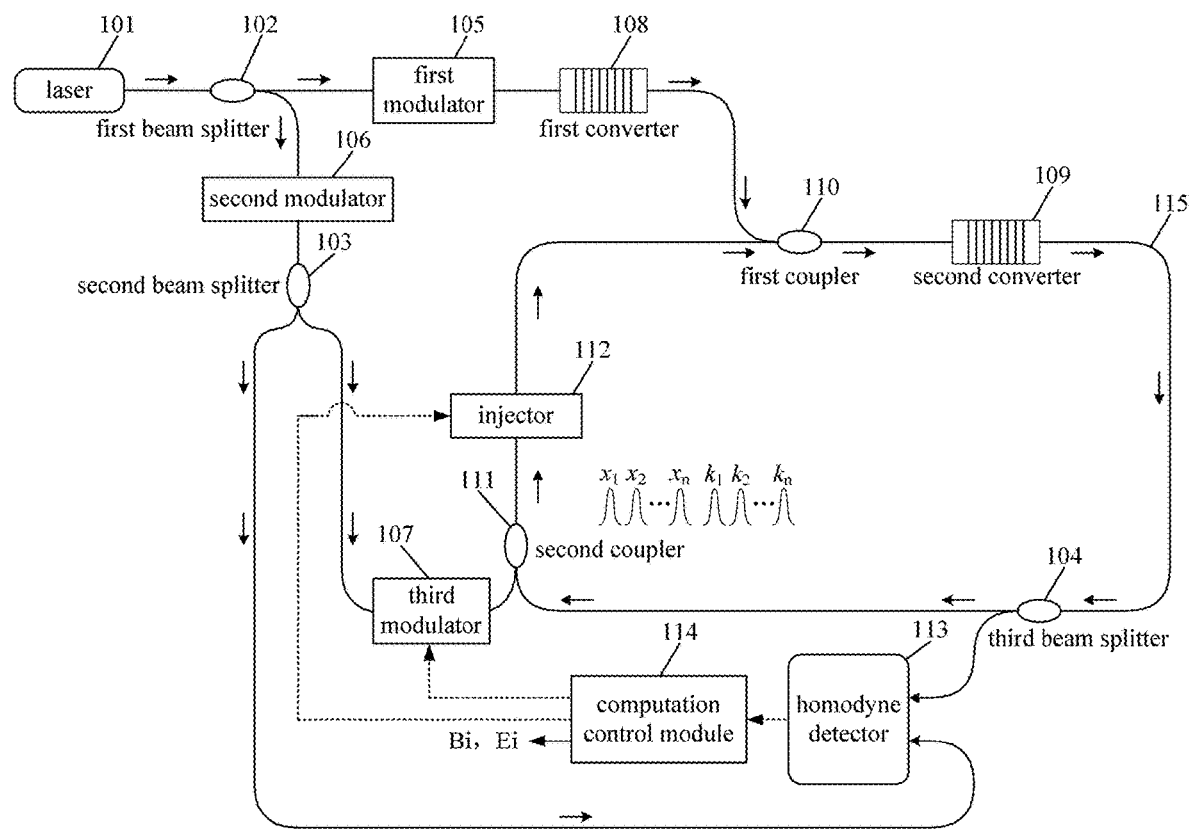
FIG. 1 is a schematic structural diagram of an optical coherence computation apparatus in a specific embodiment of the present application.

FIG. 1 is a schematic structural diagram of an optical coherence computation apparatus in a specific embodiment of the present application. As shown in FIG. 1, in this specific embodiment, the optical coherence computation apparatus specifically comprises: a laser 101, a first beam splitter 102, a second beam splitter 103, a third beam splitter 104, a first modulator 105, a second modulator 106, a third modulator 107, a first converter 108, a second converter 109, a first coupler 110, a second coupler 111, an injector 112, a homodyne detector 113 and a computation control module 114; wherein,
an output end of the laser 101 is connected to an input end of the first beam splitter 102;

an output end of the first beam splitter 102 is respectively connected to input ends of the first modulator 105 and the second modulator 106;

an output end of the first modulator 105 is connected to an input end of the first converter 108;

an output end of the first converter 108 is connected to an input end of the first coupler 110;

an output end of the first coupler 110 is connected to an input end of the second converter 109;

an output end of the second converter 109 is connected to an input end of the third beam splitter 104;

an output end of the third beam splitter 104 is connected to input ends of the homodyne detector 113 and the second coupler 111 respectively;

an output end of the second modulator 106 is connected to an input end of the second beam splitter 103;

an output end of the second beam splitter 103 is connected to input ends of the homodyne detector 113 and the third modulator 107 respectively;

an output end of the homodyne detector 113 is connected to an input end of the computation control module 114;

an output end of the computation control module 114 is connected to input ends of the third modulator 107 and the injector 112 respectively;

an output end of the third modulator 107 is connected to an input end of the second coupler 111;

an output end of the second coupler 111 is connected to an input end of the injector 112;

an output end of the injector 112 is connected to an input end of the first coupler 110; and the first coupler 110, the second converter 109, the third beam splitter 104, the second coupler 111 and the injector 112 are connected in sequence through optical fibers to form a ring resonator 115.

In addition, in the technical solution of the present application, the above-mentioned optical coherence computation apparatus can be implemented through a variety of specific implementation methods. The following will take several specific implementation methods as examples to introduce the technical solution of the present application in detail.

For example, in a specific embodiment of the present application:

the laser 101 is used to output a pulse laser with a first wavelength;

the first beam splitter 102 is used to divide the pulse laser output by the laser 101 into two pulse lasers, which are output to the first modulator 105 and the second modulator 106 respectively;

the first modulator 105 is used to periodically output a first timing sequence pulse group to the first converter 108 according to the received pulse laser; wherein each first timing sequence pulse group comprises n pulse lasers, and n is an integer greater than 1;

the first converter 108 is used to convert the received pulse laser with a first wavelength into a pulse laser with a second wavelength, and input the pulse laser to the second converter in the ring resonator 115 through the first coupler 110;

the second converter 109 is used to convert the received pulse laser with the second wavelength into a pulse laser with a first wavelength, and transmit the pulse laser to the third beam splitter 104;

the third beam splitter 104 is used to divide each received pulse laser into two pulse lasers; wherein one pulse laser is output to the second coupler 111; and the other pulse laser is output to the homodyne detector 113;

the second modulator 106 is used to periodically output a second timing sequence pulse group to the second beam splitter 103 according to the received pulse laser; wherein each second timing sequence pulse group comprises n pulse lasers; there is a preset first time interval between the time when the second modulator 106 outputs the second timing sequence pulse group and the time when the first modulator 105 outputs the first timing sequence pulse group;

the second beam splitter 103 is used to divide each received pulse laser into two pulse lasers; wherein one pulse laser is output to the third modulator 107, and the other pulse laser is output to the homodyne detector 113;

the homodyne detector 113 is used to perform balanced homodyne detection according to the two received pulse lasers, and send an electrical signal to the computation control module 114 according to the measurement result;

the computation control module 114 is used to calculate the current pulse spin sign $B_i$ and the current Ising energy $E_i$ according to the received electrical signal and the preset constraint matrix, and send the corresponding modulation instruction to the third modulator 107 according to the set dissipation intensity $\beta$ and coupling intensity $\varepsilon$, and send the corresponding injection instruction to the injector 112;

the third modulator 107 is used to modulate the intensity and/or phase of the pulse laser passing through according to the modulation instruction, and output the modulated pulse laser to the second coupler 111, so as to be input into the ring resonator 115 through the second coupler 111;

the second coupler 111 is used to output the received pulse laser to the injector 112; and the injector 112 is used to perform mutual injection operation on the received first timing sequence pulse group and second timing sequence pulse group according to the injection instruction, and output the first timing sequence pulse group and the second timing sequence pulse group after completing the mutual injection operation to the second converter 109 through the first coupler 110; wherein, there is a preset first time interval between the time when the injector 112 outputs the second timing sequence pulse group and the time when the injector 112 outputs the first timing sequence pulse group.

For another example, in a specific embodiment of the present application, the laser 101 can periodically and continuously output timing sequence pulse of equal intensity, that is, a pulse laser (which can be called a timing sequence pulse) with a preset first wavelength (for example, 1560 nanometers) is output every period of time (for example, a preset time length), and the intensity of each pulse laser is equal (for example, with a preset frequency and a preset power). For example, the above-mentioned laser 101 can output a pulse laser with equal intensity and a wavelength of 1560 nanometers every output cycle (for example, 1 millisecond).

The pulse laser output by the laser 101 can be transmitted to the above-mentioned first beam splitter 102. The first beam splitter 102 can divide each received pulse laser into two pulse lasers according to a preset ratio, and output them to the first modulator 105 and the second modulator 106 respectively.

In addition, as an example, in a specific embodiment of the present application, the first modulator and the second modulator can both be intensity modulators (IM), which can modulate the intensity of each received pulse laser. For example, the intensity of some pulse lasers that are needed (or allowed to pass) may not be changed, while the intensity of some pulse lasers that are not needed (or not allowed to pass) may be modulated to 0.

Therefore, the first modulator and the second modulator can output n timing sequence pulses at regular intervals (for example, a preset output period) according to the received pulse laser, and the n timing sequence pulses are called a timing sequence pulse group, so that the timing sequence pulse group can be output periodically; and the time for the two modulators to output the timing sequence pulse group can be controlled so that there is a preset first time interval between the two timing sequence pulse groups output by the two modulators.

For example, assuming that the output cycles of the first modulator and the second modulator are both 100 milliseconds, the first modulator and the second modulator can both output a timing sequence pulse group every 100 milliseconds, each timing sequence pulse group includes 5 pulse lasers (which can be called timing sequence pulses), and the time interval between each pulse laser is 1 millisecond.

Assuming that the time starting point of a certain output cycle of the first modulator is t0, the first modulator can output a timing sequence pulse every 1 millisecond starting from t0 (that is, the first modulator at this time does not change the intensity of the received pulse laser), and output a total of 5 timing sequence pulses to form a first timing sequence pulse group $(x_1, x_2, \ldots x_5)$; and during the period from (t0+5) to (t0+100) milliseconds, no timing sequence pulses are output (that is, during this period, the first modulator modulates the intensity of the received pulse laser to 0).

The second modulator can output a timing sequence pulse every 1 millisecond starting from (t0+10) milliseconds, and output a total of 5 timing sequence pulses to form a second timing sequence pulse group $(k_1, k_2, \ldots k_5)$; and no timing sequence pulses are output during the period from (t0+15) to (t0+100) milliseconds.

Therefore, through the above-mentioned first modulator and the second modulator, the output time of the two timing sequence pulse groups can be staggered, so that the first timing sequence pulse group and the second timing sequence pulse group can be transmitted in the ring resonator at a preset first time interval (for example, 5 milliseconds) in subsequent operations.

The first modulator 105 outputs the first timing sequence pulse group to the first converter 108, and the first converter 108 converts each pulse laser with a first wavelength (e.g., 1560 nanometers) in the first timing sequence pulse group into a pulse laser with a second wavelength (e.g., 780 nanometers), and then inputs it into the ring resonator 115 through the first coupler 110, and transmits it to the second converter 109 in the ring resonator 115.

The second converter 109 converts the received pulse laser with a second wavelength (e.g., 780 nanometers) into a pulse laser with a first wavelength (e.g., 1560 nanometers), and transmits it to the third beam splitter 104 in the ring resonator 115.

The third beam splitter 104 divides each received pulse laser into two pulse lasers according to a preset ratio; one pulse laser is output to the homodyne detector 113; and the other pulse laser continues to be output to the second coupler 111 through the ring resonator 115, forming the first timing sequence pulse group $(x_1, x_2, \ldots x_n)$ as shown in FIG. 1, and continues to be output to the injector 112 through the ring resonator 115.

In addition, the second modulator 106 outputs the generated second timing sequence pulse group to the second beam splitter 103.

The second beam splitter 103 divides each received pulse laser into two pulse lasers according to a preset ratio; one pulse laser is output to the third modulator 107, and the other pulse laser is output to the homodyne detector 113.

After receiving two pulse lasers from two input ends, the homodyne detector 113 can perform balanced homodyne detection according to the two received pulse lasers, and send an electrical signal to the computation control module 114 according to the measurement results.

After receiving the electrical signal, the computation control module 114 can calculate the current pulse spin sign $B_i$ (i.e., the i-th pulse spin sign) and the current Ising energy $E_i$ (i.e., the i-th Ising energy) according to the received electrical signal and the preset constraint matrix, and send the corresponding modulation instruction to the third modulator 107 according to the preset dissipation intensity $\beta$ and coupling intensity $\varepsilon$, and send the corresponding injection instruction to the injector 112.

The third modulator 107 modulates the intensity and/or phase of the pulse laser passing through according to the modulation instruction, and outputs the modulated pulse laser to the second coupler 111, which is input into the ring resonator 115 through the second coupler 111 to form the second timing sequence pulse group $(k_1, k_2, \ldots k_n)$ as shown in FIG. 1, and continues to be output to the injector 112 through the ring resonator 115.

Since there is a preset first time interval (for example, 5 milliseconds) between the time when the second modulator 106 outputs the second timing sequence pulse group and the time when the first modulator 105 outputs the first timing sequence pulse group, the first timing sequence pulse group $(x_1, x_2, \ldots x_n)$ transmitted in the ring resonator 115 arrives at the injector 112 earlier than the second timing sequence pulse group $(k_1, k_2, \ldots k_n)$, and the two timing sequence pulse groups have the above-mentioned preset first time interval between them.

After receiving the first timing sequence pulse group and the second timing sequence pulse group, the injector 112 can perform a mutual injection operation on the received first timing sequence pulse group and the second timing sequence pulse group according to the injection instruction, and output the first timing sequence pulse group and the second timing sequence pulse group after completing the mutual injection operation to the second converter 109 through the first coupler 110. There is still a preset first time interval between the time when the injector 112 outputs the second timing sequence pulse group and the time when the first timing sequence pulse group is output.

The two timing sequence pulse groups after injection continue to be transmitted in the ring resonator 115, and are transmitted to the third beam splitter 104 again through the first coupler 110 and the second converter 109.

The third beam splitter 104 divides each received timing sequence pulse into two pulse lasers according to a preset ratio, one pulse laser continues to be transmitted in the ring resonator 115, and the other pulse laser is output to the homodyne detector 113.

The homodyne detector 113 performs balanced homodyne detection according to the two pulse lasers received from the two input ends, and sends an electrical signal to the computation control module 114 according to the measurement results.

In addition, as an example, in a specific embodiment of the present application, after receiving the electrical signal, the computation control module 114 can calculate the current pulse spin sign Bi and the current Ising energy $E_i$ according to the received electrical signal and the preset constraint matrix, and determine the magnitude of the current Ising energy $E_i$ and the current optimal energy value E0.

If the current $E_i$ is less than the current optimal energy value E0, the computation control module can use the current $E_i$ as the optimal energy value E0, and the current pulse spin sign Bi and the current Ising energy $E_i$ as the current optimal computation result, and update the values of the dissipation intensity $\beta$ and the coupling intensity $\varepsilon$ according to the preset adjustment value (for example, when the preset adjustment value is 0.1, $\beta_{i+1}=\beta_i+0.1$, $\varepsilon_{i+1}=\varepsilon_i+0.1$, where $\beta_i$ and $\varepsilon_i$ are the current values of the i-th dissipation intensity and coupling intensity, $\beta_{i+1}$ and $\varepsilon_{i+1}$ are the updated values of the i+1-th dissipation intensity $\beta$ and coupling intensity $\varepsilon$, respectively), and send the corresponding modulation instruction to the third modulator and the corresponding injection instruction to the injector according to the updated values of the dissipation intensity $\beta$ and coupling intensity $\varepsilon$.

If the current $E_i$ is greater than or equal to the current optimal energy value E0, the computation control module can reset the values of the dissipation intensity $\beta$ and the coupling intensity $\varepsilon$ (for example, randomly select a value from the preset first value range as the current value of the dissipation intensity $\beta$, and use the initial value $\varepsilon_0$ of the coupling intensity $\varepsilon$ as the current value of the coupling intensity $\varepsilon$), and send a corresponding modulation instruction to the third modulator and a corresponding injection instruction to the injector according to the reset values of the dissipation intensity $\beta$ and the coupling intensity $\varepsilon$.

The third modulator 107 modulates the intensity and/or phase of the pulse laser passing through according to the modulation instruction, and outputs the modulated pulse laser to the second coupler 111, so as to be input into the ring resonator 115 through the second coupler 111, and continue to be output to the injector 112 through the ring resonator 115.

The injector 112 can perform a mutual injection operation on the received first timing sequence pulse group and the second timing sequence pulse group according to the injection instruction, and output the first timing sequence pulse group and the second timing sequence pulse group after completing the mutual injection operation to the second converter 109 through the first coupler 110. There is still a preset first time interval between the time when the injector 112 outputs the second timing sequence pulse group and the time when the injector 112 outputs the first timing sequence pulse group.

After the injection, the two sequential pulse groups continue to be transmitted in the ring resonator 115, and the next cycle is continued, which will not be described here.

By performing the above operations in the above optical coherence computation apparatus, the computational problem to be processed (for example, combinatorial optimization problem, Ising problem, etc.) can be mapped to the corresponding Ising model during the computation process, and the optimal solution can be found by searching the ground state energy, effectively solving the computational problem to be processed, and solving the problem of amplitude heterogeneity in the coherent Ising machine in the prior art causing mapping errors.

Since the above-mentioned structure is used in the optical coherence computation apparatus of the present application, a preset number of auxiliary error correction pulses that do not undergo nonlinear gain are introduced into a network of laser pulses based on a degenerate optical parametric oscillator and having a preset number of mutually coupled laser pulses, i.e., the pulse lasers ($k_1$, $k_2$, ... $k_n$) in the second timing sequence pulse group, so that they can be coupled with nonlinear gain pulses, i.e., the pulse lasers ($x_1$, $x_2$, ... $x_n$) in the first timing sequence pulse group to form pulse neurons, and error correction of the computation process of the optical coherence computation apparatus is achieved through the dynamic characteristics of the pulse neurons. By judging the magnitude of the current Ising energy $E_i$ and the current energy optimum value E0, and performing subsequent operations according to the judgment result, the optimal solution (i.e., the energy optimum value E0) can be found by searching the ground state energy; and even when the computation process falls into a fixed point of the local optimal value, the local optimal value can be made unstable by changing the parameter conditions (for example, updating or resetting the values of the dissipation intensity $\beta$ and the coupling intensity $\varepsilon$), so as to obtain a better global optimal solution (i.e., the optimal computation result), thereby effectively improving the computation performance of the optical coherence computation apparatus, and improving the computation speed and accuracy of the optical coherence computation apparatus during the process of solving the computation problems to be processed.

In addition, as an example, in a specific embodiment of the present application, the optical coherence computation apparatus may further comprise: a timer (not shown in FIG. 1); wherein, the timer is used to send a stop instruction to the computation control module when a running time of the optical coherence computation apparatus is equal to or exceeds a preset time threshold; and the computation control module is used to output the current optimal computation result (i.e., the pulse spin sign $B_i$ and Ising energy $E_i$ corresponding to the current optimal energy value E0) as a final computation result according to the stop instruction.

In addition, as an example, in a specific embodiment of the present application, the timer can be set separately and connected to the computation control module; or it can be directly integrated or set in the computation control module.

Therefore, through the above-mentioned timer, the optical coherence computation apparatus can automatically output the final computation result after running for a preset time without manual intervention.

In addition, after outputting the above-mentioned final computation result, the whole process can be ended and the above-mentioned optical coherent computation apparatus can be turned off.

Figure 2:
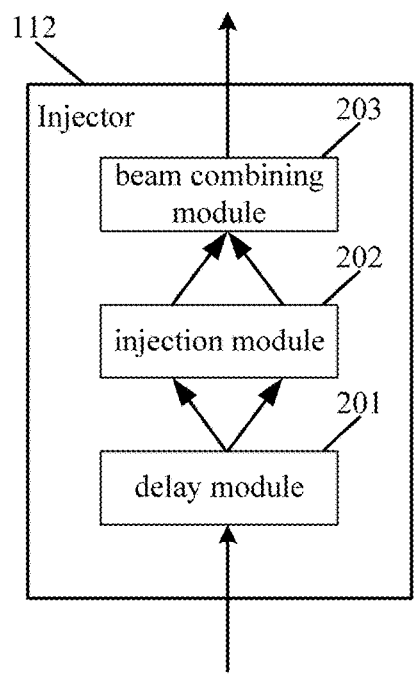
FIG. 2 is a schematic structural diagram of an injector in a specific embodiment of the present application.

In addition, as an example, as shown in FIG. 2, in a specific embodiment of the present application, the injector 112 may comprise: a delay module 201, an injection module 202 and a beam combining module 203.

The delay module 201 is used to delay the received pulse lasers respectively according to the preset delay strategy, so that the first pulse in the first timing sequence pulse group ($x_1$, $x_2$, ... $x_n$) and the first pulse in the second timing sequence pulse group ($k_1, k_2, \ldots k_n$) are simultaneously transmitted to the two input ends of the injection module 202.

The injection module 202 is used to perform mutual injection operation on the corresponding pulse lasers in the first timing sequence pulse group and the second timing sequence pulse group according to the injection instruction. For example, a part of $x_1$ (a preset ratio of pulses, for example, 10%) can be injected into $k_1$, and a part of $k_1$ (a preset ratio of pulses, for example, 10%) can be injected into $x_1, \ldots$, and so on. Among them, the injection instruction can be used to control the ratio of the two pulses injected into each other. Through the above mutual injection, each pulse neuron $x_i k_i$ can be formed.

The beam combining module 203 is used to delay the received pulse lasers respectively according to the preset delay strategy, and output the received pulse lasers to the first coupler in sequence according to the preset first time interval and sending order, forming the first timing sequence pulse group and the second timing sequence pulse group after completing injection, and the two timing sequence pulse groups are still separated by the preset first time interval. For example, the second timing sequence pulse group after completing injection is still transmitted after the first timing sequence pulse group.

In addition, as an example, in a specific embodiment of the present application, the third modulator 107 may comprise: an intensity modulator (IM) and a phase modulator (PM);

the intensity modulator is used to modulate the intensity of the corresponding pulse laser according to the modulation instruction; and the phase modulator is used to modulate the phase of the corresponding pulse laser according to the modulation instruction.

In addition, as an example, in a specific embodiment of the present application, the first converter may be a Second Harmonic Generation (SHG).

In addition, as an example, in a specific embodiment of the present application, the first converter and the second converter may be Periodically Poled Lithium Niobate (PPLN) crystals or other suitable converters.

In addition, as an example, in a specific embodiment of the present application, the computation control module may adopt a Field-Programmable Gate Array (FPGA), so that the corresponding computation and control may be performed in a programming manner.

In addition, as an example, in a specific embodiment of the present application, the first wavelength may be 1560 nanometers, and the second wavelength may be 780 nanometers.

In addition, in the technical solution of the present application, based on the above-mentioned optical coherence computation apparatus, the present application also proposes an error correction method for the optical coherence computation apparatus.

Figure 3:
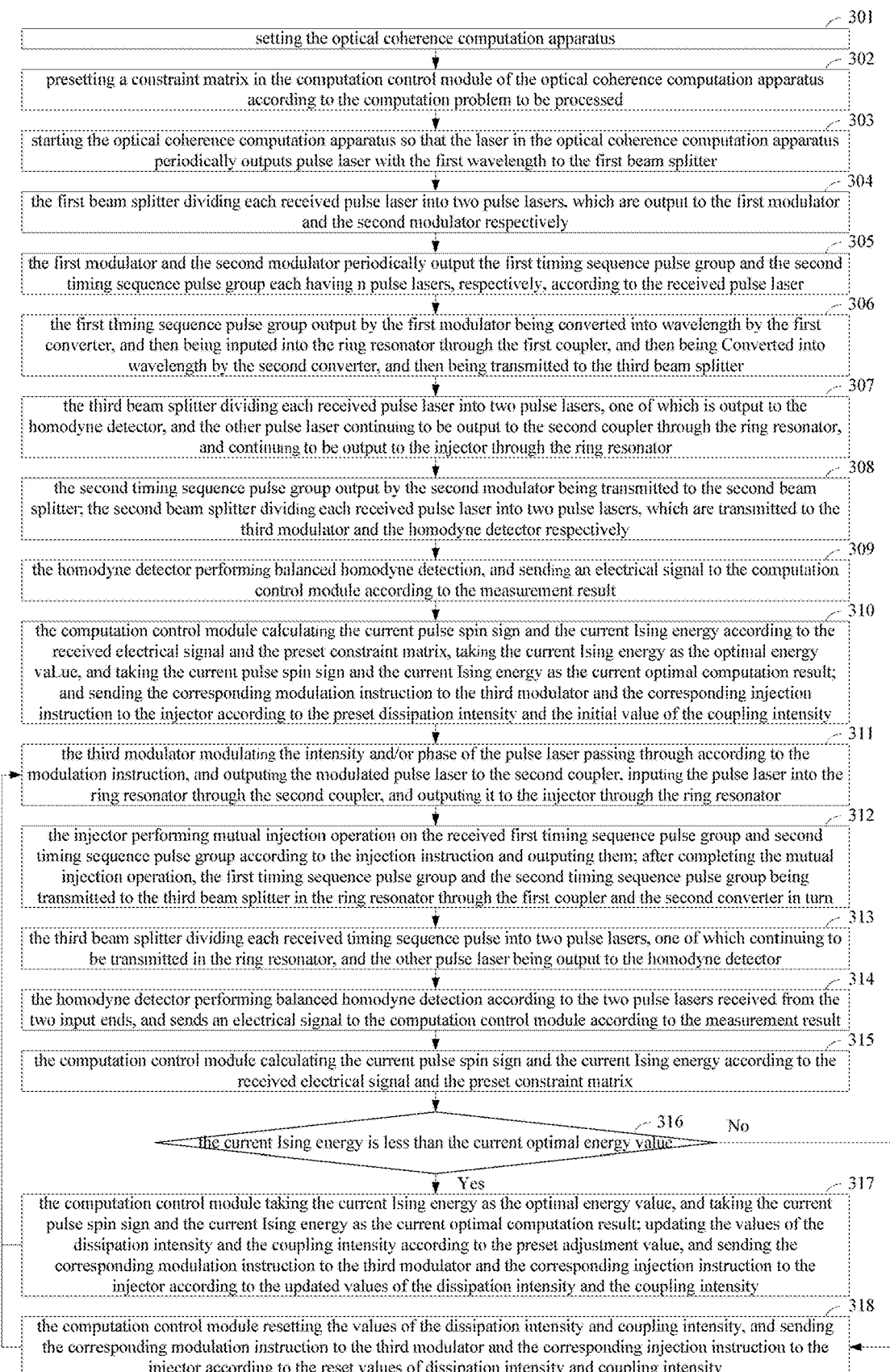
FIG. 3 is a flow chart of an error correction method for an optical coherence computation apparatus in a specific embodiment of the present application.

FIG. 3 is a flow chart of an error correction method for an optical coherence computation apparatus in a specific embodiment of the present application. As shown in FIG. 3, in this specific embodiment, the error correction method for the optical coherence computation apparatus comprises the following steps.

Step 301, setting the optical coherence computation apparatus.

In the technical solution of the present application, an optical coherence computation apparatus as shown in FIG. 1 can be preset according to the computation problem to be processed (for example, combinatorial optimization problem, Ising problem, etc.).

Step 302, presetting a constraint matrix in the computation control module of the optical coherence computation apparatus according to the computation problem to be processed.

In the technical solution of the present application, a corresponding constraint matrix can be preset in the computation control module of the optical coherence computation apparatus according to the computation problem to be processed (for example, combinatorial optimization problem, Ising problem, etc.).

For example, in a specific embodiment of the present application, the corresponding pulse neurons can be set according to each node in the computation problem to be processed, and the corresponding value can be set for each matrix element in the constraint matrix according to the interaction strength and/or connection relationship between each pulse neuron.

For example, in a specific embodiment of the present application, when there is interaction between the i-th pulse neuron and the j-th pulse neuron, the value of the corresponding matrix element Jij in the constraint matrix can be set to the interaction strength between the i-th pulse neuron and the j-th pulse neuron; and so on.

Of course, in the technical solution of the present application, other methods can also be used to set other values for each matrix element in the constraint matrix according to the needs of the actual application scenario, and the specific setting methods will not be described here one by one.

Step 303, starting the optical coherence computation apparatus so that the laser in the optical coherence computation apparatus periodically outputs pulse laser with the first wavelength to the first beam splitter.

Step 304, the first beam splitter dividing each received pulse laser into two pulse lasers, which are output to the first modulator and the second modulator respectively.

In this step, when the pulse laser output by the laser is received, the first beam splitter can divide each received pulse laser into two pulse lasers according to a preset ratio, and output them to the first modulator and the second modulator respectively.

In addition, in the technical solution of the present application, the value of the above ratio can be preset according to the needs of the actual application scenario. For example, in a specific embodiment of the present application, the preset ratio can be: 1:1, that is, it is evenly divided into two pulse lasers. Of course, the preset ratio can also be other suitable values, which are not listed here one by one.

Step 305, the first modulator and the second modulator periodically output the first timing sequence pulse group and the second timing sequence pulse group each having n pulse lasers, respectively, according to the received pulse laser, with a preset first time interval between the first timing sequence pulse group and the second timing sequence pulse group.

In addition, in the technical solution of the present application, the value of n can be preset according to the needs of the actual application scenario. For example, in a specific embodiment of the present application, the value of n can be 3, 4, 5, 10 or 15, or other suitable values, which are not listed here one by one.

Step 306, the first timing sequence pulse group output by the first modulator being converted into wavelength by the first converter, and then being inputted into the ring resonator through the first coupler, and then being converted into wavelength by the second converter, and then being transmitted to the third beam splitter.

Step 307, the third beam splitter dividing each received pulse laser into two pulse lasers, one of which is output to the homodyne detector, and the other pulse laser continuing to be output to the second coupler through the ring resonator, and continuing to be output to the injector through the ring resonator.

In the technical solution of the present application, the third beam splitter can divide each received pulse laser into two pulse lasers according to a preset ratio, and output them to the homodyne detector and the injector respectively.

In addition, in the technical solution of the present application, the value of the above ratio can be preset according to the needs of the actual application scenario. For example, in a specific embodiment of the present application, the preset ratio can be: 1:9, that is, 10% of the pulse laser is output to the homodyne detector for measurement, and 90% of the pulse laser continues to be output to the injector through the ring resonator. Of course, the preset ratio can also be other suitable values, which are not listed here one by one.

Step 308, the second timing sequence pulse group output by the second modulator being transmitted to the second beam splitter; the second beam splitter dividing each received pulse laser into two pulse lasers, which are transmitted to the third modulator and the homodyne detector respectively.

In the technical solution of the present application, after receiving the pulse laser, the second beam splitter divides each received pulse laser into two pulse lasers according to a preset ratio; one of which is output to the third modulator, and the other pulse laser is output to the homodyne detector.

In addition, in the technical solution of the present application, the values of the above ratios can be preset according to the needs of actual application scenarios. For example, in a specific embodiment of the present application, the preset ratio may be 1:1, that is, it is evenly divided into two pulse lasers. Of course, the preset ratio can also be other suitable values, which are not listed here one by one.

Step 309, the homodyne detector performing balanced homodyne detection according to the two received pulse lasers, and sending an electrical signal to the computation control module according to the measurement result.

Step 310, the computation control module calculating the current pulse spin sign and the current Ising energy according to the received electrical signal and the preset constraint matrix, taking the current Ising energy as the optimal energy value, and taking the current pulse spin sign and the current Ising energy as the current optimal computation result; and sending the corresponding modulation instruction to the third modulator and the corresponding injection instruction to the injector according to the preset dissipation intensity and the initial value of the coupling intensity.

In the technical solution of the present application, when the computation control module receives an electrical signal for the first time, it can calculate the current pulse spin sign $B_i$ (for example, $B_1$, indicating the first pulse spin sign) and the current Ising energy $E_i$ (for example, $E_1$, indicating the first Ising energy) according to the received electrical signal and the preset constraint matrix, and takes the current Ising energy $E_i$ as the optimal energy value E0, and takes the current pulse spin sign $B_i$ and the current Ising energy $E_i$ as the current optimal computation results; and according to the preset initial values of the dissipation intensity $\beta$ and the coupling strength $\varepsilon$ (for example, the initial value of the dissipation intensity $\beta$ is preset to $\beta_0$, and the initial value of the coupling strength $\varepsilon$ is preset to $\varepsilon_0$), sends corresponding modulation instructions to the third modulator, and sends corresponding injection instructions to the injector.

Step 311, the third modulator modulating the intensity and/or phase of the pulse laser passing through according to the modulation instruction, and outputting the modulated pulse laser to the second coupler, inputting the pulse laser into the ring resonator through the second coupler, and outputting the pulse laser to the injector through the ring resonator.

In the technical solution of the present application, since the computation control module sends the modulation instruction according to the corresponding dissipation intensity $\beta$ and coupling intensity $\varepsilon$, the modulation instruction can carry information related to the dissipation intensity $\beta$ and coupling intensity $\varepsilon$. The dissipation intensity $\beta$ can generally be related to the intensity of the pulse laser, and the coupling intensity $\varepsilon$ can generally be related to the phase of the pulse laser; therefore, the third modulator can modulate the intensity and/or phase of the pulse laser according to the received modulation instruction, and then outputs the modulated pulse laser to the second coupler, inputs it into the ring resonator through the second coupler, and outputs it to the injector through the ring resonator.

Step 312, the injector performing mutual injection operation on the received first timing sequence pulse group and second timing sequence pulse group according to the injection instruction and outputting the first timing sequence pulse group and the second timing sequence pulse group; after completing the mutual injection operation, the first timing sequence pulse group and the second timing sequence pulse group being transmitted to the third beam splitter in the ring resonator through the first coupler and the second converter in turn.

In the technical solution of the present application, since the computation control module sends the injection instruction according to the corresponding dissipation intensity $\beta$ and coupling intensity $\varepsilon$, the injection instruction can also carry information related to the dissipation intensity $\beta$ and coupling intensity $\varepsilon$. The dissipation intensity $\beta$ can generally be related to the intensity of the injected pulse laser, and the coupling intensity $\varepsilon$ can generally be related to the ratio of the injected pulse laser; therefore, the injector can perform mutual injection operation and output the received first timing sequence pulse group and second timing sequence pulse group according to the received injection instruction.

Step 313, the third beam splitter dividing each received timing sequence pulse into two pulse lasers, one of which continuing to be transmitted in the ring resonator, and the other pulse laser being output to the homodyne detector.

In the technical solution of the present application, the third beam splitter can divide each received pulse laser into two pulse lasers according to a preset ratio, and output them to the homodyne detector and the injector respectively.

Step 314, the homodyne detector performing balanced homodyne detection according to the two pulse lasers received from the two input ends, and sending an electrical signal to the computation control module according to the measurement result.

Step 315, the computation control module calculating the current pulse spin sign and the current Ising energy according to the received electrical signal and the preset constraint matrix.

Step 316, determine whether the current Ising energy $E_i$ is less than the current optimal energy value; if so, executing step 317; otherwise, executing step 318.

Step 317, the computation control module taking the current Ising energy as the optimal energy value, and taking the current pulse spin sign and the current Ising energy as the current optimal computation result; updating the values of the dissipation intensity and the coupling intensity according to the preset adjustment value, and sending the corresponding modulation instruction to the third modulator and the corresponding injection instruction to the injector according to the updated values of the dissipation intensity and the coupling intensity; returns to execute step 311.

In this step, since the current Ising energy $E_i$ is less than the current optimal energy value E0, it means that the current Ising energy $E_i$ is a better solution, so the computation control module will take the current $E_i$ as the optimal energy value E0 to update the optimal energy value $E_0$, and take the current pulse spin sign and the current Ising energy as the current optimal computation result to update the optimal computation result; then, update the values of the dissipation intensity β and the coupling intensity ε, and send the corresponding modulation instruction to the third modulator and the corresponding injection instruction to the injector according to the updated values of the dissipation intensity β and the coupling intensity ε, return to step 311, and start the next round of loop operation.

In addition, in the technical solution of the present application, the values of the dissipation strength β and the coupling strength ε can be updated according to the preset adjustment value in a variety of ways.

For example, in a specific embodiment of the present application, the updating the values of the dissipation strength and the coupling strength according to the preset adjustment value may comprise:

the current values of the dissipation strength and the coupling strength are increased by the preset adjustment value respectively, as the updated values of the dissipation strength and the coupling strength.

For example, when the preset adjustment value is 0.1, $\beta_{i+1}=\beta_i+0.1$, $\varepsilon_{i+1}=\varepsilon_i+0.1$. Wherein, $\beta_i$ and $\varepsilon_i$ are the values of the current i-th dissipation intensity and coupling intensity, respectively, and $\beta_{i+1}$ and $\varepsilon_{i+1}$ are the updated values of the i+1-th dissipation intensity β and coupling intensity ε, respectively.

Step 318, the computation control module resetting the values of the dissipation intensity and coupling intensity, and sending the corresponding modulation instruction to the third modulator and the corresponding injection instruction to the injector according to the reset values of dissipation intensity and coupling intensity; returning to execute step 311.

In this step, since the current Ising energy $E_i$ is greater than or equal to the current optimal energy value $E_0$, it means that the current Ising energy $E_i$ is not a better solution. Therefore, the current optimal energy value $E_0$ is not changed, nor is the current optimal computation result. Instead, the values of the dissipation intensity β and the coupling intensity ε are directly reset, and then according to the reset values of the dissipation intensity β and the coupling intensity ε, the corresponding modulation instruction is sent to the third modulator, and the corresponding injection instruction is sent to the injector, and the next round of loop operation is started.

In addition, in the technical solution of the present application, the values of the dissipation intensity β and the coupling intensity ε can be reset in a variety of ways.

For example, as an example, in a specific embodiment of the present application, the resetting of the values of the dissipation intensity and the coupling intensity may comprise:

randomly selecting a value from a preset first value range as the current value of the dissipation intensity β; and taking the initial value $\varepsilon_0$ of the coupling intensity ε as the current value of the coupling intensity ε.

Among them, in the technical solution of the present application, the value domain of the above-mentioned first value range can be preset according to the needs of the actual application scenario, so it will not be repeated here.

Therefore, through the error correction method of the above-mentioned optical coherence computation apparatus, the current Ising energy $E_i$ and the current optimal energy value $E_0$ can be judged, and subsequent operations can be performed according to the judgment result. The optimal solution (that is, the optimal energy value E0) can be found by searching the ground state energy; and even when the computation process falls into the fixed point of the local optimal value, the local optimal value can be destabilized by changing the parameter conditions (for example, updating or resetting the values of the dissipation intensity β and the coupling intensity ε), so that a better global optimal solution (that is, the optimal computation result) can be obtained, thereby effectively improving the computation performance of the optical coherence computation apparatus and improving the computation speed and accuracy of the optical coherence computation apparatus during the process of solving the computation problems to be processed.

In addition, as an example, in a specific embodiment of the present application, before returning to step 311, the error correction method of the optical coherence computation apparatus may further comprise:

determining whether the running time of the optical coherence computation apparatus is less than the preset time threshold;

if yes, returning to step 311; otherwise, the computation control module outputting the current optimal computation result (i.e., the pulse spin sign $B_i$ and Ising energy $E_i$ corresponding to the current optimal energy value E0) as the final computation result.

Therefore, after the optical coherence computation apparatus runs for a preset time, it can output the final computation result by itself.

In addition, after outputting the above-mentioned final computation result, the whole process can be ended and the above-mentioned optical coherence computation apparatus can be turned off.

To sum up, in the technical solution of the present application, a preset number of auxiliary error correction pulses without nonlinear gain are introduced into a laser pulse network based on a degenerate optical parametric oscillator and having a preset number of mutually coupled laser pulses, i.e., the pulse laser $(k_1, k_2, \ldots k_n)$ in the second timing sequence pulse group, so that it can be coupled with the nonlinear gain pulse, i.e., the pulse laser $(x_1, x_2, \ldots x_n)$ in the first timing sequence pulse group to form a pulse neuron, and the error correction of the computation process of the optical coherence computation apparatus is realized through the dynamic characteristics of the pulse neuron. By comparing the magnitude of the current Ising energy $E_i$ and the current energy optimum value E0, and performing subsequent operations according to the comparison result, the search for the optimal solution (i.e., the energy optimum value E0) can be realized by searching the ground state energy; and even when the computation process falls into a fixed point of the local optimal value, the local optimal value can be destabilized by changing the parameter conditions (for example, updating or resetting the values of the dissipation intensity β and the coupling intensity ε), so that a better global optimal solution (i.e., the optimal computation result) can be obtained, thereby effectively solving the problem of amplitude heterogeneity in the coherent Ising machine in the prior art that cannot be correctly mapped, improving the computation performance of the optical coherence computation apparatus, and significantly improving the computation speed and computation accuracy of the optical coherence computation apparatus in the process of solving the computational problem to be processed (especially when dealing with complex problems).

The above descriptions are only preferred embodiments of the present disclosure, and are not intended to limit the present disclosure. Any modifications, equivalent replacements, improvements, etc. made within the spirit and principles of the present disclosure shall be included in the present disclosure within the scope of protection.

What is claimed is:

1. An optical coherence computation apparatus, comprising: a laser, a first beam splitter, a second beam splitter, a third beam splitter, a first modulator, a second modulator, a third modulator, a first converter, a second converter, a first coupler, a second coupler, an injector, a homodyne detector and a computation control module; wherein, an output end of the laser is connected to an input end of the first beam splitter;

an output end of the first beam splitter is respectively connected to input ends of the first modulator and the second modulator;

an output end of the first modulator is connected to an input end of the first converter;

an output end of the first converter is connected to an input end of the first coupler;

an output end of the first coupler is connected to an input end of the second converter;

an output end of the second converter is connected to an input end of the third beam splitter;

an output end of the third beam splitter is connected to input ends of the homodyne detector and the second coupler respectively;

an output end of the second modulator is connected to an input end of the second beam splitter;

an output end of the second beam splitter is connected to input ends of the homodyne detector and the third modulator respectively;

an output end of the homodyne detector is connected to an input end of the computation control module;

an output end of the computation control module is connected to input ends of the third modulator and the injector respectively;

an output end of the third modulator is connected to an input end of the second coupler;

an output end of the second coupler is connected to an input end of the injector;

an output end of the injector is connected to an input end of the first coupler;

the first coupler, the second converter, the third beam splitter, the second coupler and the injector are connected in sequence through optical fibers to form a ring resonator;

the laser is used to output a pulse laser with a first wavelength;

the first beam splitter is used to divide the pulse laser output by the laser into two pulse lasers, which are output to the first modulator and the second modulator respectively;

the first modulator is used to periodically output a first timing sequence pulse group to the first converter according to the received pulse laser; wherein each first timing sequence pulse group comprises n pulse lasers, and n is an integer greater than 1;

the first converter is used to convert the received pulse laser with a first wavelength into a pulse laser with a second wavelength, and input the pulse laser to the second converter in the ring resonator through the first coupler;

the second converter is used to convert the received pulse laser with a second wavelength into a pulse laser with a first wavelength, and transmit the pulse laser to the third beam splitter;

the third beam splitter is used to divide each received pulse laser into two pulse lasers; wherein one pulse laser is output to the second coupler; and the other pulse laser is output to the homodyne detector;

the second modulator is used to periodically output a second timing sequence pulse group to the second beam splitter according to the received pulse laser; wherein each second timing sequence pulse group comprises n pulse lasers; there is a preset first time interval between the time when the second modulator outputs the second timing sequence pulse group and the time when the first modulator outputs the first timing sequence pulse group;

the second beam splitter is used to divide each received pulse laser into two pulse lasers; wherein one pulse laser is output to the third modulator and the other pulse laser is output to the homodyne detector;

the homodyne detector is used to perform balanced homodyne detection according to the two received pulse lasers, and send an electrical signal to the computation control module according to the measurement result;

the computation control module is used to calculate the current pulse spin sign and the current Ising energy according to the received electrical signal and the preset constraint matrix, and send the corresponding modulation instruction to the third modulator according to the preset dissipation intensity and coupling intensity, and send the corresponding injection instruction to the injector;

the third modulator is used to modulate the intensity and/or phase of the pulse laser passing through according to the modulation instruction, and output the modulated pulse laser to the second coupler, so as to be input into the ring resonator through the second coupler;

the second coupler is used to output the received pulse laser to the injector; and the injector is used to perform mutual injection operation on the received first timing sequence pulse group and second timing sequence pulse group according to the injection instruction, and output the first timing sequence pulse group and the second timing sequence pulse group after completing the mutual injection operation to the second converter through the first coupler; wherein, there is a preset first time interval between the time when the injector outputs the second timing sequence pulse group and the time when the injector outputs the first timing sequence pulse group.

2. The optical coherence computation apparatus according to claim 1, further comprising: a timer; wherein, the timer is used to send a stop instruction to the computation control module when a running time of the optical coherence computation apparatus is equal to or exceeds a preset time threshold; and the computation control module is used to output the current optimal computation result as a final computation result according to the stop instruction.

3. The optical coherence computation apparatus according to claim 1, wherein, the injector comprises: a delay module, an injection module and a beam combining module;

the delay module is used to delay the received pulse laser according to the preset delay strategy, so that the first pulse in the first timing sequence pulse group and the first pulse in the second timing sequence pulse group are simultaneously transmitted to the two input ends of the injection module;

the injection module is used to perform mutual injection operation on the corresponding pulse lasers in the first timing sequence pulse group and the second timing sequence pulse group according to the injection instruction; and the beam combining module is used to delay the received pulse lasers according to the preset delay strategy, and output the received pulse lasers to the first coupler in sequence according to the preset first time interval and sending order, forming the first timing sequence pulse group and the second timing sequence pulse group after completing injection, and the two timing sequence pulse groups are still separated by the preset first time interval.

4. The optical coherence computation apparatus according to claim 1, wherein, the third modulator comprises: an intensity modulator and a phase modulator;

the intensity modulator is used to modulate the intensity of the corresponding pulse laser according to the modulation instruction; and the phase modulator is used to modulate the phase of the corresponding pulse laser according to the modulation instruction.

5. The optical coherence computation apparatus according to claim 1, wherein, the first converter is a second harmonic generator.

6. The optical coherence computation apparatus according to claim 1, wherein, the first converter and the second converter are both periodically poled lithium niobate crystals.

7. The optical coherence computation apparatus according to claim 1, wherein, the computation control module is a field programmable gate array.

8. An error correction method for an optical coherence computation apparatus, comprising:

Step A, setting the optical coherence computation apparatus according to claim 1;

Step B, presetting a constraint matrix in the computation control module of the optical coherence computation apparatus according to the computation problem to be processed;

Step C, starting the optical coherence computation apparatus so that the laser in the optical coherence computation apparatus periodically outputs pulse laser with the first wavelength to the first beam splitter;

Step D, the first beam splitter dividing each received pulse laser into two pulse lasers, which are output to the first modulator and the second modulator respectively;

Step E, the first modulator and the second modulator periodically outputting a first timing sequence pulse group and a second timing sequence pulse group each having n pulse lasers, respectively, according to the received pulse laser, with a preset first time interval between the first timing sequence pulse group and the second timing sequence pulse group; wherein n is an integer greater than 1;

Step F, the first timing sequence pulse group output by the first modulator being converted into wavelength by the first converter, and then being inputted into the ring resonator through the first coupler, and then being converted into wavelength by the second converter, and then being transmitted to the third beam splitter;

Step G, the third beam splitter dividing each received pulse laser into two pulse lasers, one of which is output to the homodyne detector, and the other pulse laser continuing to be output to the second coupler through the ring resonator, and continuing to be output to the injector through the ring resonator;

Step H, the second timing sequence pulse group output by the second modulator being transmitted to the second beam splitter; the second beam splitter dividing each received pulse laser into two pulse lasers, which are transmitted to the third modulator and the homodyne detector respectively;

Step I, the homodyne detector performing balanced homodyne detection according to the two received pulse lasers, and sending an electrical signal to the computation control module according to the measurement result;

Step J, the computation control module calculating the current pulse spin sign and the current Ising energy according to the received electrical signal and the preset constraint matrix, taking the current Ising energy as the optimal energy value, and taking the current pulse spin sign and the current Ising energy as the current optimal computation result; and sending the corresponding modulation instruction to the third modulator and the corresponding injection instruction to the injector according to the preset dissipation intensity and the initial value of the coupling intensity;

Step K, the third modulator modulating the intensity and/or phase of the pulse laser passing through according to the modulation instruction, and outputting the modulated pulse laser to the second coupler, inputting the pulse laser into the ring resonator through the second coupler, and outputting the pulse laser to the injector through the ring resonator;

Step L, the injector performing mutual injection operation on the received first timing sequence pulse group and second timing sequence pulse group according to the injection instruction and outputting the first timing sequence pulse group and the second timing sequence pulse group; after completing the mutual injection operation, the first timing sequence pulse group and the second timing sequence pulse group being transmitted to the third beam splitter in the ring resonator through the first coupler and the second converter in turn;

Step M, the third beam splitter dividing each received timing sequence pulse into two pulse lasers, one of which continuing to be transmitted in the ring resonator, and the other pulse laser being output to the homodyne detector;

Step N, the homodyne detector performing balanced homodyne detection according to the two pulse lasers received from the two input ends, and sending an electrical signal to the computation control module according to the measurement results;

Step O, the computation control module calculating the current pulse spin sign and the current Ising energy according to the received electrical signal and the preset constraint matrix;

Step P, determining whether the current Ising energy $E_i$ is less than the current optimal energy value; if so, executing step Q; otherwise, executing step R;

Step Q, the computation control module taking the current Ising energy as the optimal energy value, and taking the current pulse spin sign and the current Ising energy as the current optimal computation result; updating the values of the dissipation intensity and the coupling intensity according to the preset adjustment value, and sending the corresponding modulation instruction to the third modulator and the corresponding injection instruction to the injector according to the updated the values of dissipation intensity and coupling intensity; returns to execute step K; and Step R, the computation control module resetting the values of dissipation intensity and coupling intensity, and sending the corresponding modulation instruction to the third modulator and the corresponding injection instruction to the injector according to the reset values of dissipation intensity and coupling intensity; returning to execute step K.

9. The method according to claim 8, before returning to execute step K, the method further comprising:

determining whether the running time of the optical coherence computation apparatus is less than a preset time threshold; and if yes, returning to execute step K; otherwise, the computation control module outputting the current optimal computation result as the final computation result.

10. The method according to claim 8, wherein the updating of the values of the dissipation strength and the coupling strength according to the preset adjustment value comprises:

adding the current values of the dissipation intensity and the coupling intensity by the preset adjustment value respectively as the updated values of the dissipation intensity and the coupling intensity.

11. The method according to claim 8, wherein resetting the values of dissipation intensity and coupling intensity comprises:

randomly selecting a value from a preset first value range as the current value of dissipation intensity; and taking the initial value of coupling intensity as the current value of coupling intensity.

\* \* \* \* \*